United States Patent [19]

Gilbreath-Frandsen et al.

[11] Patent Number: 4,878,718

[45] Date of Patent: Nov. 7, 1989

[54] METHOD FOR HOLOGRAPHIC CORRECTION OF BEAMS OF COHERENT LIGHT

[75] Inventors: C. Gilbreath-Frandsen, Washington, D.C.; James W. Wagner, Annapolis, Md.

[73] Assignee: The United States of America as represented by the Secretary of the Navy, Washington, D.C.

[21] Appl. No.: 938,314

[22] Filed: Dec. 5, 1986

[51] Int. Cl.[4] .................................................. G02B 5/32
[52] U.S. Cl. .................................... 350/3.69; 350/3.72; 350/3.7
[58] Field of Search ...................... 350/3.7, 3.71, 3.69, 350/3.6; 356/347

[56] References Cited

U.S. PATENT DOCUMENTS 3,838,903 10/1974 Leith et al. ........................ 350/3.69
4,355,858 10/1982 Funato et al. .................... 350/3.72

OTHER PUBLICATIONS

W. H. Carter & J. J. Caulfield, "Hologram Laser-Beam Corrector and Combiner for a Satellite Data Link", Applied Optics, vol. 24, No. 14, 15 Jul. 85, pp. 2150-2155.

C. Gilbreath-Frandsen et al., "Some Research Toward the Development of a Hologram Laser Beam Corrector-Collimator for Use in a Satellite Data Link", SPIE, vol. 600, Progress in Holographic Applications, (1985), pp. 81-88.

Lin, L. H. et al., "Effective and Aberration-Free Wave Front Reconstruction from Holograms Illuminated at Wavelengths Differing from the Forming Wavelength", Applied Optics, vol. 10, No. 6, 1314-1318, Jun. 1971.

Dickson, L. D. et al., "Holography in the IBM 3687, Supermarket Scanner", I.B.M. J. Res. Dev., vol 26, No. 2, Mar. 1982, pp. 228-234.

G. C. Gilbreath and A. E. Clement, "Absorption Holograms Made with Mode-Stabilized Laser Diodes for Use in a Satellite Communications Link", Optics Letters, vol. 12, No. 9, Sep. 1987.

Primary Examiner—Rodney B. Bovernick
Assistant Examiner—J. Patrick Ryan
Attorney, Agent, or Firm—Thomas E. McDonnell; A. David Spevack; Edward F. Miles

[57] ABSTRACT

A method for producing desired changes in a beam of coherent light radiating at $\lambda_1$, comprising the steps of (a) splitting a beam of coherent light radiating at $\lambda_1$, correcting one of the beams to achieve a desired wavefront and recombining this beam with the first, where a record medium (I) is placed such that the beams are separated by an angle determined by Bragg's law and the line spacing of the interference pattern formed by the two beams; (b) developing the first medium such that a diffraction grating of spacing $d_1$ is recorded in a material, specifically sensitive to $\lambda_1$, which will become the master; (c) illuminating the master with a second wavelength, $\lambda_2$, selected by choice of a second medium which possesses very high diffraction efficiency. The second beam is split into two parts. The first is directed to the master. This diffracted order is recombined with the second beam. These beams are separated by an angle determined by Bragg's law and the line spacing of the interference pattern formed by the two beams. The record of the second medium (II) is placed at this juncture. A second grating with grating spacing $d_2$ is recorded in this medium containing a record of the first hologram diffracted from the master, which forms the working hologram; and (d) illuminating the working hologram with the original beam at $\lambda_1$ at an incidnece angle specific to the grating spacing $d_2$ and $\lambda_1$, wherein the desired wavefront at $\lambda_1$ is diffracted.

14 Claims, 1 Drawing Sheet $\lambda_1 = 2d_1 \sin \theta_1$ $\lambda_2 = 2d_1 \sin \theta_c$ $Q \geq 10: Q = \dfrac{2\pi \lambda_2 t_2}{n d_2^2}$ $\lambda_2 = 2d_2 \sin(\phi/2)$

METHOD FOR HOLOGRAPHIC CORRECTION OF BEAMS OF COHERENT LIGHT

BACKGROUND OF THE INVENTION

The invention relates generally to a holographic method for correcting anomalies in a coherent light beam containing rays of a first wavelength and more particularly to a holographic method for correcting anomalies in an infrared (IR) beam from a laser diode or a laser diode array.

In the past, consideration has been given to the use of holograms in lieu of traditional optical elements for correcting aberrated wavefronts from laser diodes or laser diode arrays to produce well-collimated beams suitable for use in free space optical communications between satellites.

Laser diodes or laser diode arrays are uniquely suited to spacecraft communications because of their small size and mass. However, they do present problems. Single diode lasers produce diverging cones of light that are highly astigmatic. These devices also lack the power needed for a communications system. Coherent light producing diode arrays have sufficient power, but produce rapidly diverging cones of light with highly irregular wavefronts. Thus, the radiation from such a device must be transformed by an appropriate optical system which corrects the aberrated wavefront, collimates the beam, and directs the beam toward the receiver. Conventional optical systems are presently used to transform the beams radiated by single diode lasers. Such systems include many lenses and an anamorphic prism pair to correct the astigmatism. These elements of the system are quite massive for satellite use and the lasers produce light inadequate in power for various potential applications. On the other hand, no really suitable optical system is available to efficiently transform beams from laser diode arrays because of the complexity of the beam's wavefront. Thus, the higher power available from these arrays is not fully available for use.

It would be a great advantage if holograms could be used in place of conventional optics to transform these laser beams. Holograms are thin, low in mass, and rugged. A single lightweight hologram can perform the same operations as a heavier complex optical system. Furthermore, single hologram can perform operations which cannot be preformed by conventional optical systems. It appears possible that holograms can be used to efficiently correct complicated wavefront aberrations in a beam from a laser diode array. Existing literature addresses the feasibility of the application of holograms as beam transformers in satellite communications links together with some difficulties to be overcome and possible solutions have been mentioned.

The straightforward approach to obtaining a suitable hologram would be to expose a holographic emulsion to the interference pattern formed between the aberrated light cone radiated by a laser diode or a laser diode array and a replica of a good communications beam obtained by beam splitting, optically correcting, and collimating light from the same source. The hologram would serve in lieu of a traditional optical system to transform the light cone into the communications beam. However, the difficulty with this approach is the unavailability of high-resolution emulsions capable of producing efficient holograms at the wavelength of interest (e.g., an infrared wavelength), which are sensitive at the wavelength of interest. Moreover, achieving a diffraction-limited optical beam with a hologram is not straightforward. Two critical design considerations in the construction of holographic optical elements are efficiency, $\eta$, and sensitivity. Hologram efficiency ($\eta$) involves the ratio of usable light to the total light illuminating the holographic medium. If a hologram is illuminated with 10 mW but only 1 mW is available for use after striking the hologram the efficiency ($\eta$) is just 10%. For spacecraft communications, where total output power is a critical parameter, high efficiency ($\eta$) is required.

Wavefront fidelity is best achieved when a hologram is illuminated with one of the beams used to create it. Consequently it is important to record the actual wavefront in the medium itself. However, presently holographic emulsions which diffract efficiently are not sensitive in the infrared (IR). These materials are typically sensitive in the blue. New polymers are sensitive in the red. Consequently, direct recording of the actual wavefront required for the best recovery of the desired beam is not possible with the straightforward approach.

OBJECTS OF THE INVENTION

An object of the invention is to employ a method which enables an optical beam to be recorded holographically and reconstructed at the wavelength of interest with high diffraction efficiency and wavefront fidelity, when the wavelength of construction and reconstruction is not compatible with presently available holographic recording materials.

Another object of the invention is to utilize a holographic medium to efficiently correct anomalies in a coherent light beam.

Still another object of the invention is to utilize a holographic medium to correct the aberrated wavefront of a coherent light beam of a specific wavelength of interest, to collimate the beam, and to point the beam in a specific direction.

Yet another object of the invention is to utilize a holographic method to correct and manipulate a coherent light beam by using a working hologram containing a record of a master hologram.

Still another object of the invention is to make and use a highly efficient working hologram to manipulate a coherent light beam of a specific wavelength into a desired condition.

Yet another object of the invention is to provide a holographic method involving use of two holograms, use of two wavelengths ($\lambda_1$ and $\lambda_2$) of light, and use of two holographic materials to correct and/or direct a beam of coherent light radiating at $\lambda_1$.

Other objects of the invention will become apparent from the detailed description of the invention given after the following statement summarizing the invention.

SUMMARY OF THE INVENTION

The invention employs a two-step construction, three-step reconstruction process which enables the actual wavefront of the beam to be utilized to be reconstructed with high diffraction efficiency. The master is made with the laser to be used as the transmitter at $\lambda_1$. The beams are split. One of the "legs" is manipulated to provide the beamfront of interest. The beams are recombined and the hologram is recorded in an emulsion sensitive at $\lambda_1$. See FIG. 1.

The second hologram is made at $\lambda_2$ dictated by an emulsion which has high diffraction efficiency. Again, the beams are split and the master hologram is inserted in one of the beams. The diffracted first order is combined with the second beam and recorded in the second plate at $\lambda_2$. See FIG. 2.

The third step in the process is reconstruction. The second hologram is illuminated with the original laser at the angle of incidence appropriate to $\lambda_1$ and Bragg's Law The desired beam is then reconstructed with high efficiency at $\lambda_1$ See FIG. 3.

DETAILED DESCRIPTION OF THE DRAWING

FIGS. 1–3 of the drawing illustrates three key steps in the method provided by the invention.

DETAILED DESCRIPTION OF THE PREFERRED EMBODIMENT

The method of the invention can be described as follows.

Figure 1:
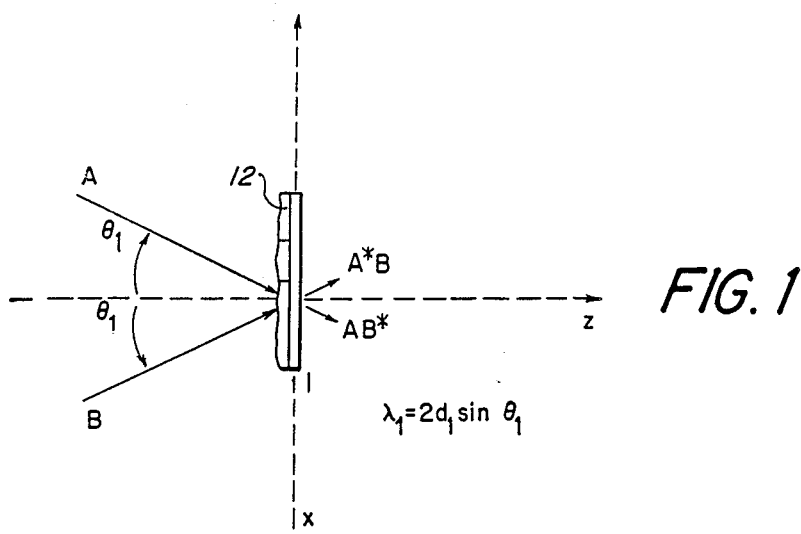
FIG. 1 illustrates the use of $\lambda_1$ in constructing a master hologram.
Figure 2:
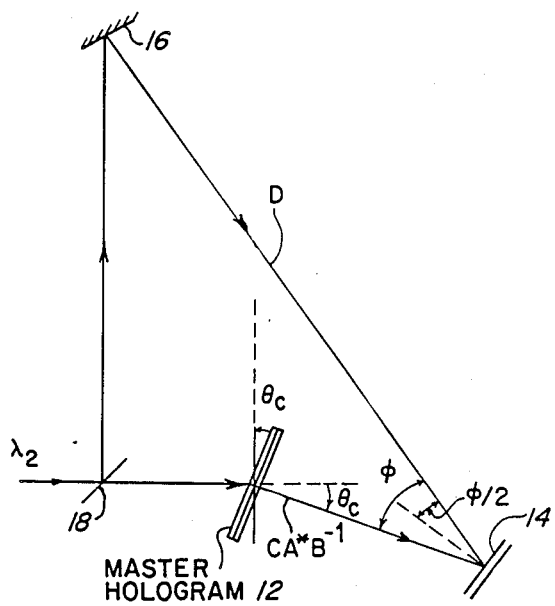
FIG. 2 illustrates the use of $\lambda_2$ in constructing a working hologram.

First, a holographic plate, labelled I, is illuminated by two beams, labelled A and B, separated by the angle $2\theta_I$. This is illustrated in FIG. 2. Each beam strikes the plate I at a specific incidence angle, labelled $\theta_1$. The plate I comprises a transparent substrate and a holographic record medium 12 on the substrate. The medium 12 is a film of thickness $t_1$. Plate I is oriented with its medium 12 on a plane perpendicular to the z-axis. The two beams combine at the medium 12 to create a diffraction grating having a spacing d, determined by the equation $\lambda_1 = 2d_1 \sin \lambda_1$ where $\lambda_1$ is a first wavelength of light radiated from a source (not shown) and split into two beams A and B that strike the medium 12 after one of the two beams has been corrected in a manner to be described later. The beams A and B together with the plate I result in two beams A*B and AB* which radiate from the back of the plate I, where A* and B* are conjugate beams.

Second, the plate I is developed.

Third, another holographic plate, labelled II, is illuminated by two beams, labelled C and D, separated by an angle $\phi$. This is illustrated in FIG. 2. Each beam strikes the plate II at a specific incidence angle, labelled $\phi/2$. The plate II comprises a transparent substrate and a holographic record medium 14 on the substrate. The medium 14 is a material of thickness $t_2$. Plate II is oriented in space relative to the previously developed plate I, a mirror 16, a beam splitter 18 and a beam of coherent light radiating at $\lambda_2$ in a specified path. The two beams combine at the medium 14 to create a diffraction grating having a spacing $d_2$ determined by the equation $\lambda_2 = 2d_2 \sin(\phi/2)$, where $\lambda_2$ is a second wavelength of light radiated from a source (not shown) and split into two beams C and D that strike the medium 14 after one of the beams, to wit, beam C has struck medium 12. The beam C strikes the medium 12 at an incidence angle $\theta_c$ determined by the equation $\lambda_2 = 2d_1 \sin \theta_c$, where $\lambda_2$ is the second wavelength, and $d_1$ is the spacing of the diffraction grating in the developed plate I.

Fourth, the plate II is developed.

Figure 3:
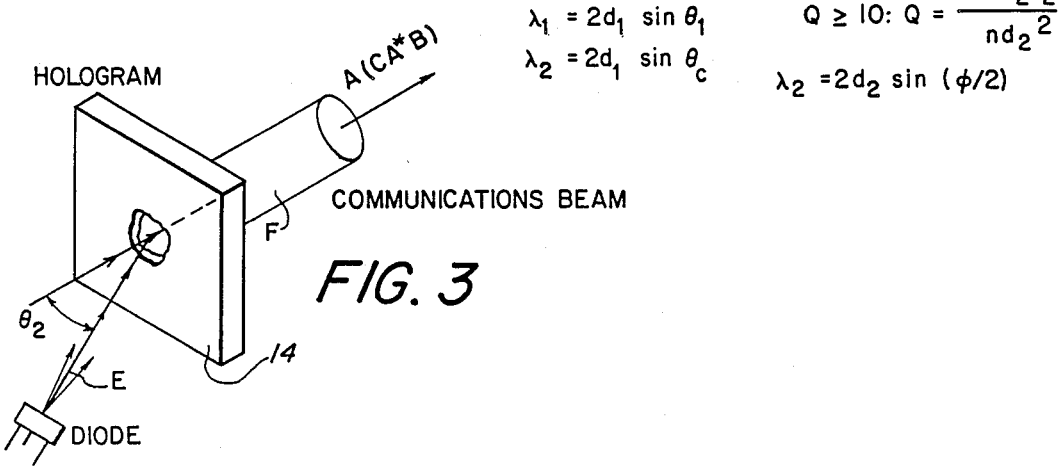
FIG. 3 illustrates the use of $\lambda_1$ in reconstructing a beam of coherent light in a particular fashion.

Fifth, the developed plate II is illuminated by the original beam, $\lambda_1$, labelled E striking the plate at an incidence angle $\theta_2$. This is illustrated in FIG. 3. The beam E and the holographic second medium 14 yield a final beam, labelled F, useful as a communications beam, the beam F radiating from the back of the medium 14 at a specified angle.

The developed plate I becomes a master hologram, or master, and the developed plate II becomes a working hologram in the method described, wherein the master hologram and the working hologram are made by using $\lambda_1$ and $\lambda_2$ as described and the desired beam, F, is made using the working hologram and $\lambda_1$.

The method that has been described in broad terms produces a working hologram having an efficiency, Q, that is equal to or greater than ten (10), where the efficiency Q is defined by the equation $Q = 2\pi\lambda_2 \, t_2/nd_2^2$ where $\pi = 3.14 \ldots$, $\lambda_2 =$ the second wavelength, $t_2 =$ thickness of the second medium 14, $n =$ diffraction index of medium 14, and $d_2 =$ spacing of the diffraction grating in the medium 14.

The initial or master hologram, is a transmission, absorption hologram made by interfering a collimated corrected wavefront with an uncorrected wavefront from a given diode which is mode-stabilized.

The working hologram is a transmission, phase hologram made with $\lambda_2$ consistent with the wavelength sensitivity of a given highly diffractive material, illuminating the master combining one of the diffracted orders with a collimated plane wave at plate II. In constructing the working hologram care must be taken to compute the incidence angle from coupled wave theory for optically thick holograms. A phase volume holographic optical element with a relatively thick emulsion will reconstruct many orders of the Bessel function if the angle of incidence is computed based strictly on Bragg's Law. Consequently, energy is diffracted into many rather than just the first order and efficiency is significantly impacted. To address this problem, a result from coupled wave theory for optically thick holograms is invoked $$Q = \frac{2\pi\lambda t}{nd^2}$$

where
t = emulsion thickness
n = index of refraction of gelatin

For optically thick holograms, $Q \geq 10$. Solving for $d_2$ using this value and Bragg's Law, one can compute $\phi/2$.

From $\phi$, the proper optical configuration (FIG. 2) is built and the second hologram is exposed and developed according to the chemistry and handling requirements for the material selected.

The second hologram now preserves the corrected communications beam as a grating defined with $d_2$.

Returning to Bragg's Law, $\theta_2$ is computed and the proper geometry for reconstruction with the original uncorrected beam at $\lambda_1$ and Plate II is established, as shown in FIG. 3.

In order to achieve near-theoretical values, highly efficient emulsions must be employed. To achieve nearly 100% efficiency for volume transmission and/or reflection holograms, Dichromated Gelatin (DCG) appears to be one of the best emulsions presently available. Although DCG employed as the second medium is extremely efficient, it is relatively insensitive in the red and virtually non-responsive at 750 nm and above.

Laser diodes typically emit from 750 nm, to 900 nm. Most holograms made with DCG are made at 488 nm, a lasing line of Argon (Ar+). Other materials such as photoresist, sensitive in the blue, and polymers which are sensitive in the red, may also be used.

Infrared-sensitive film is employed as the first emulsion Type IVN, with a resolution of 250 line pairs/mm can be used. The diode used is mode-stabilized at the proper current density and temperature values to make absorption holograms in the infrared.

If a single-mode diode is used, the classical Seidel aberrations and wavefront corrections can be achieved by conventional optical means in the making of the master. If a diode array is employed, computer-generated grating solutions may be the means to produce a desired wavefront. Chromatic aberrations induced by wavelength shift inherent in the process are corrected by reconstruction with the original beam. Elliptic aberrations induced by construction and reconstruction at different angles can be minimized by careful choice of architectures.

EXAMPLE 1

For proof-of-concept, a master hologram has been fabricated using an intentionally aberrated beam of coherent light of 632.8 nanometer wavelength ($\lambda_1$) from a He/Ne laser in lieu of a beam of coherent light of 750–900 nanometer wavelength from a laser diode. An initial master hologram was recorded using an aberrated and unaberrated beam from a He/Ne laser as object and reference beams in a low-angle recording geometry dictated by the resolution of the IR-sensitive recording material. A working hologram was recorded at a shorter wavelength ($\lambda_2 = 488$ nm) using as an object beam, the aberrated beam reconstructed from the master at the shorter wavelength. By appropriate selection of recording geometries based on results from coupled wave theory, it was possible to ensure that the working hologram could be used as well as the master to correct the diode output. Since the working hologram is recorded at any wavelength, it was possible to exploit the efficiency available in the recording material dichromated gelatin (DCG), photoresist, or polymer used as the material in the phase hologram constituting the working hologram.

The output beam of a He/Ne laser was "aberrated" using a cylindrical lens and holographically recorded by interfering this beam with a collimated reference beam.

The plate I was developed with standard D-19 chemistry and procedures for silver halide emulsions. 649-F Kodak plates were used in the proof-of-concept. Maximum theoretical efficiencies for thin absorption holograms is 6.25%. In holograms made with 632.8 nm and this chemistry, efficiencies on the order of 9.2% were enjoyed, indicating some phase contributions.

To make the second hologram, a phase device, the first plate was illuminated with 488 nm at $\theta_c$. This angle was computed based on the actual d, recorded in plate I and Bragg's Law. *For ease of wavefront verification, the −1 order was employed. This is the conjugate order which refocuses the light. The second plate was placed a distance of 2f from the first. A collimated reference beam of 488 nm was then directed and recombined with the diffracted first order at the plate II. The power density was measured and the reference-to-object-beam ratio was adjusted to 2:1 using neutral density filters.

Exposure time was computed based on the energy density of 180 microwatts/cm$^2$ for DCG at 488 nm.

The hologram was developed according to known techniques for Dichromated Gelatin holograms. Table 1 delineates that procedure.

TABLE 1

DEVELOPMENT PROCEDURE FOR PHASE VOLUME HOLOGRAMS MADE FROM DICHROMATED GELATIN AND RELATED CHEMISTRY

| | SOLUTION | TIME | LIGHTING |
|---|---|---|---|
| 1. | 0.5% solution of ammonium dichromate | 5 min. | dim red |
| 2. | Rapid Fixer with Hardener | 5 min. | dim red |
| 3. | Running water | 10 min. | white |
| 4. | De-ionized water | 2 min. | white |
| 5. | 50% solution of de-ionized and isopropanol | 3 min. | white |
| 6. | 100% solution of isopropanol | 3 min. | white |

The hologram was allowed to dry in a dry box for one day before testing. After testing, it was dried in the dry box for 3 more days, then sealed with a cover plate and optical epoxy.

Holograms made from Dichromated Gelatin are volume phase holograms. The information is stored in a fringe pattern recorded as changes in the index of refraction of the emulsion. As shown in Table 4-1, theoretical efficiencies for these types of holograms can be very high.

Based on computations for various values of Q, and emulsion thickness, t, fringe spacing, $d_2$, and $\lambda_2$, candidate angles were selected. As a baseline, $Q = 10$ was chosen and 6 orders were evident upon reconstruction with $\lambda_2$, and 4 orders with $\lambda_1$, as well as a diffraction efficiency of 84.8%. The greater the Q, the fewer orders are reconstructed and for a specific Q, the available energy is diffracted into the preferred order proffering maximum diffraction efficiency for a given architecture.

EXAMPLE 2

A master hologram was made in Kodak 649F spectroscopic plates with 633 nm radiation from a He-Ne laser. To make this simulation more realistic, the grating spacing in the master hologram was limited to 4 microns, corresponding to the resolution limit of the IR sensitive IVN emulsion. The 4 micron grating period was obtained using a Mach-Zehnder interferometer. One of the beams through the interferometer was used to simulate the astigmatic beam from the diode laser and the other simulated the well-collimated communications beam. A cylindrical lens was placed two focal lengths from the hologram plane in the simulated diode laser beam to produce astigmatism. The two beams were made to interfere at the hologram, and the plate was aligned so that the fringes formed in the grating were normal to the surface of the plate. The exposure and processing were carried out using the Kodak recommendations for absorption holograms in 649F. The diffraction efficiency into the first order of these master holograms was found to be 9% to 10%.

The master hologram was employed with dichromated gelatin to create the working hologram The plates were obtained from Dikrotek with an emulsion thickness of 13±1 microns. Efficient working holograms were obtained from the master hologram by greatly decreasing the grating period with the following method The master hologram was reconstructed with a plane wave of 488 nm radiation from an Ar+ laser incident at an angle which maximized the brightness of the −1 order beam diffracted from the hologram This order was made to interfere with a reference plane wave at the surface of the working hologram plate located two focal lengths of the cylindrical lens, now the hologram, from the plane of the master hologram as shown in FIG. 2. The angle of the reference beam relative to the beam reconstructed from the master hologram was varied to study the effect on the working hologram's efficiency. The dichromated gelatin holograms were developed with alcohol and water techniques specified by Dikrotek, and outlined in Table 1.

The developed working holograms made at 488 nm were reconstructed with 633 nm. A specific hologram was carefully aligned with the incident light beam at the appropriate Bragg angle of reconstruction to maximize the light intensity diffracted into the first order. The hologram efficiency into this first order and presence of other orders was noted as given in Table 2. From the table we notice that the working holograms were all quite efficient when reconstructed with 633 nm but that some of the holograms still produced observable higher orders. The number of observed orders decreased as Q was increased by increasing $\phi$, as predicted. In the effort described above, high efficiencies were achieved using a 13 micron emulsion thickness with a grating spacing of about 1.2 microns, or a Q of 30.

TABLE 2

| DIFFRACTION EFFICIENCY INTO OBSERVED ORDERS | | | |
|---|---|---|---|
| EXPERIMENTAL RESULTS | | | |
| Q | 0 (DEG) | ORDER | (633) (nm) |
| 10 | 17.33° | +1 | 1.42% |
|  |  | 0 | 17.95 |
|  |  | −1 | 74.53 |
|  |  | −2 | 5.66 |
|  |  | −3 | (nominal) |
| 20 | 24.61 | +1 | .36 |
|  |  | 0 | 10.0 |
|  |  | −1 | 87.86 |
|  |  | −2 | 1.43 |
| 30 | 30.26 | 0 | 4.85 |
|  |  | −1 | 94.0 |
| 35 | 32.75 | 0 | 5.42 |
|  |  | −1 | 93.60 |
| 40 | 35.08 | 0 | 7.72 |
|  |  | −1 | 91.90 | t ~ 13μ

Holograms with at least 94% efficiency can be made in dichromated gelatin reconstructed at 633 nm. It can be appreciated that equivalent results can be obtained for working holograms that are made to be reconstructed at one of the diode laser wavelengths. To date, masters made in the near Infrared with single-mode, mode-stabilized diodes have yielded absorption holograms with diffractive efficiencies of greater than 6%. These are presently being employed as outlined to make working holograms with photoresist. This approach offers highly efficient holograms with potentially minimized aberrations for operation in the near-Infrared.

EXAMPLE 3

The method can be performed using $\lambda_1$, in the range of 750–900 nanometers, $\lambda_1$. being radiated by a laser diode or a laser diode array, and using $\lambda_2$ in the range of 400–650 nanometers, $\lambda_2$ being radiated from an appropriate light source (e.g. Argon laser). The key to good results is to use a highly diffractive second medium 14 sensitive to $\lambda_2$.

EXAMPLE 4

The method can be performed using $\lambda_1=854$ nanometers and $\lambda_2=488$ nanometers, using dichromated gelatin.

EXAMPLE 5

The method can be performed using $\lambda_1=632$ nanometers and $\lambda_2=488$ nanometers, using dichromated gelatin.

EXAMPLE 6

The method can be performed using an IR-sensitive spectroscopic emulsion as the material of the first medium and dichromated gelatin is used as the material of the second medium. Kodak Spectroscopic emulsion IVN sensitive at 800–900 nanometers and Dichromated Gelatin (DCG) sensitive at 488 nanometers can be used.

EXAMPLE 7

The method can be performed using an IR-sensitive spectroscopic emulsion as the material of the first medium and photoresist used as the material of the second medium.

EXAMPLE 8

The method can be performed using an IR-sensitive spectroscopic emulsion as the material of the first medium and a polymer as the second medium.

EXAMPLE 9

The method can be performed using an IR-sensitive spectroscopic emulsion as the material of the first medium and using a functional equivalent to dichromated gelatin, photoresist, or polymer as the material of the second emulsion.

EXAMPLE 10

The method can be performed using an IR laser diode or an IR laser diode array to radiate $\lambda_1$ and using an appropriate laser source (e.g. an Argon laser) to radiate $\lambda_2$.

Obviously, numerous additional modifications and variations of the present invention are possible in light of the above teachings. It is therefore to be understood that the invention may be practiced within the scope of the appended claims otherwise than as specifically described herein.

We claim:

1. A method for forming holograms comprising steps of:

directing first and second mutually coherent beams of light of wavelength $\lambda_1$ onto a first holographic emulsion at an angle $\theta_1$ measured in opposite directions, respectively, from the normal to said first holographic emulsion, said directing being effective to create an interference pattern of line spacing $d_1$ on said first holographic emulsion, said $\theta_1$ being defined by: $\lambda_1=2d_1\mathrm{Sin}(\lambda_1)$;

developing said first holographic emulsion effective to cause said first interference pattern to be fixed in said first holographic emulsion as a first developed hologram corresponding to said first interference pattern;

directing a third beam of light having wavelength $\lambda_2$ onto said developed hologram at a Bragg angle $\theta_c$ effective to cause said first developed hologram to different said third beam of light, said $\theta_c$ being defined by: $\lambda_2 = 2d_1 \sin(\theta_c)$;

directing the diffracted third beam and a fourth beam of light coherent with said third beam onto a second holographic emulsion at an Bragg angle ($\phi/2$) measured in opposite directions respectively, from the normal to the second holographic emulsion, said directing of said diffracted third beam being effective to create a second interference pattern of line spacing $d_2$ on said second holographic emulsion, said first holographic emulsion being selected to be more sensitive to said $\lambda_1$ than said $\lambda_2$, said second holographic emulsion being selected to be more sensitive to said $\lambda_2$ than $\lambda_1$, said $\phi/2$ being constrained to satisfy both:

$\lambda_2 = 2d_2 \sin(\phi/2)$ and $10 \geq (2\pi\lambda_2 t)/(nd_2^2)$ said t being the thickness of said second holographic emulsion;
and
developing said second holographic emulsion effective to cause said second interference pattern to be fixed in said second holographic emulsion as a second developed hologram corresponding to said interference pattern.

2. The method of claim 1, wherein $\lambda_1$ is produced from a mode stabilized laser diode.

3. The method of claim 2, wherein:
$\lambda_1$ is between about 750 and 900 nm;
$\lambda_2$ is between about 400 to 650 nm;
said second holographic medium is a member selected from the group selected from: dichromated gelatin, photoresist, and a photosensitive polymer.

4. The method of claim 3, wherein said first holographic emulsion is an IR sensitive spectrascopic emulsion.

5. The method of claim 1, wherein $\lambda_1$ is between about 750 and 900 nm.

6. The method of claim 1, wherein $\lambda_2$ is between about 400 to 650 nm.

7. The method of claim 1, wherein said first holographic emulsion is an IR sensitive spectrascopic emulsion.

8. The method of claim 1, wherein said second holographic medium is dichromated gelatin.

9. The method of claim 1, wherein said second holographic medium is photoresist.

10. The method of claim 1, wherein said second holographic medium is a photosensitive polymer.

11. A product produced by a method for forming holograms, said method comprising steps for:
directing first and second mutually coherent beams of light of wavelength $\lambda_1$ onto a first holographic emulsion at an angle $\theta_1$ measured in opposite directions, respectively, from the normal to said first holographic emulsion, said directing being effective to create an interference pattern of line spacing $d_1$ on said first holographic emulsion, said $\lambda_1$ being defined by: $\lambda_1 = 2d_1 \sin(\theta_1)$;
developing said first holographic emulsion effective to cause said first interference pattern to be fixed in said first holographic emulsion as a first developed hologram corresponding to said first interference pattern;

directing a third beam of light having wavelength $\lambda_2$ onto said developed hologram at a Bragg angle $\theta_c$ effective to cause said first developed hologram to diffract said third beam of light, said $\theta_c$ being defined by: $\lambda_2 = 2d_1 \sin(\theta_c)$;

directing the diffracted third beam and a fourth beam of light coherent with said third beam onto a second holographic emulsion at an angle ($\phi/2$) measured in opposite directions, respectively, from the normal to the second holographic emulsion, said directing of said diffracted third beam being effective to create a second interference pattern of line spacing $d_2$ on said second holographic emulsion, said first holographic emulsion being selected to be more sensitive to said $\lambda_1$ than said $\lambda_2$, said second holographic emulsion being selected to be more sensitive to said $\lambda_2$ and $\lambda_1$, said $\phi/2$ being constrained to satisfy both:

$\lambda_2 = 2d_2 \sin(\phi/2)$ and $10 \geq (2\pi\lambda_2 t)/(nd_2^2)$ said t being the thickness of said second holographic emulsion; and developing said second holographic emulsion effective to cause said second interference pattern to be fixed in said second holographic emulsion as a second developed hologram corresponding to said interference pattern, said second developed hologram being said product.

12. An article for manufacturing a working hologram, said article comprising
first and second holographic emulsions
means for directing first and second mutually coherent beams of light of wavelength $\lambda_1$ onto said first holographic emulsion at an angle $\theta_1$ measured in opposite directions, respectively, from the normal to said first holographic emulsion, said directing being effective to create an interference pattern of line spacing $d_1$ on said first holographic emulsion, said $\lambda_1$ being defined by: $\lambda_1 = 2d_1 \sin(\lambda_1)$;
means for developing said first holographic emulsion effective to cause said first interference pattern to be fixed in said first holographic emulsion as a first developed hologram corresponding to said first interference pattern;
means for directing a third beam of light having wavelength $\lambda_2$ onto said developed hologram at a Bragg angle $\theta_c$ effective to cause said first developed hologram to diffract said third beam of light, said $\theta_c$ being defined by: $\lambda_2 = 2d_1 \sin(\theta_c)$;
means for directing the diffracted third beam and a fourth beam of light coherent with said third beam onto a second holographic emulsion at an angle ($\phi/2$) measured in opposite directions, respectively, from the normal to the second holographic emulsion, said directing of said diffracted third beam being effective to create a second interference pattern of line spacing $d_2$ on said second holographic emulsion, said first holographic emulsion being adapted to be more sensitive to said $\lambda_1$ than said $\lambda_2$, said second holographic emulsion being adapted to be more sensitive to said $\lambda_2$ than said $\lambda_1$, said $\phi/2$ being constrained to satisfy both:

$\lambda_2 = 2d_2 \sin(\phi/2)$ and $$10 \geq (2\pi\lambda_2 t)/(nd_2^2)$$

said $t$ being the thickness of said second holographic emulsion; and means for developing said second holographic emulsion effective to cause said second interference pattern to be fixed in said second holographic emulsion as a second developed hologram corresponding to said interference pattern, wherein said second developed hologram is said working hologram.

13. A method for reconstructing holographic images, said method comprising steps for:

directing first and second mutually coherent beams of light of wavelength $\lambda_1$ onto a first holographic emulsion at an angle $\theta_1$ measured in opposite directions, respectively, from the normal to said first holographic emulsion, said directing being effective to create an interference pattern of line spacing $d_1$ on said first holographic emulsion, said $\lambda_1$ being defined by:

$$\lambda_1 = 2d_1 \sin(\lambda_1);$$

developing said first holographic emulsion effective to cause said first interference pattern to fixed in said first holographic emulsion as a first developed hologram corresponding to said first interference pattern;

directing a third means of light having wavelength $\lambda_2$ onto said developed hologram at a Bragg angle $\theta_c$ effective to cause said first developed hologram to diffract said third beam of light, said $\theta_c$ being defined by: $\lambda_2 = 2d_1 \sin(\theta_c)$;

directing the diffracted third beam and a fourth beam of light coherent with said third beam onto a second holographic emulsion at an angle ($\phi/2$) measured in opposite directions, respectively, from the normal to the second holographic emulsion, said directing of said diffracted third beam being effective to create a second interference pattern of line spacing $d_2$ on said second holographic emulsion, said first holographic emulsion being selected to be more sensitive to said $\lambda_1$ than said $\lambda_2$, said second holographic emulsion being selected to be more sensitive to said $\lambda_2$ than $\lambda_1$, said $\phi/2$ being constrained to satisfy both:

$$\lambda_2 = 2d_2 \sin(\phi/2) \text{ and}$$

$$10 \geq (2\pi\lambda_2 t)/(nd_2^2)$$

said $t$ being thickness of said second holographic emulsion;

and developing said second holographic emulsion effective to cause said second interference pattern to be fixed in said second holographic emulsion as a second developed hologram corresponding to said interference pattern;

creating a fifth beam of light, said fifth beam of light being spatially coherent, temporally coherent, and phase matched to one of said first or said second beams;

directing said fifth beam onto said second developed hologram at angle $\theta_2$ effective to permit diffraction of said fifth beam of light by said second developed hologram to reconstruct the other of said first or said second bean of light.

14. The method of claim 13, wherein said fifth beam of light is generated by the same source as generated said one of said first or said second beams.

* * * * *